Jan. 17, 1956　　　P. S. MARTIN ET AL　　　2,730,937
CAMERAS
Filed July 9, 1954
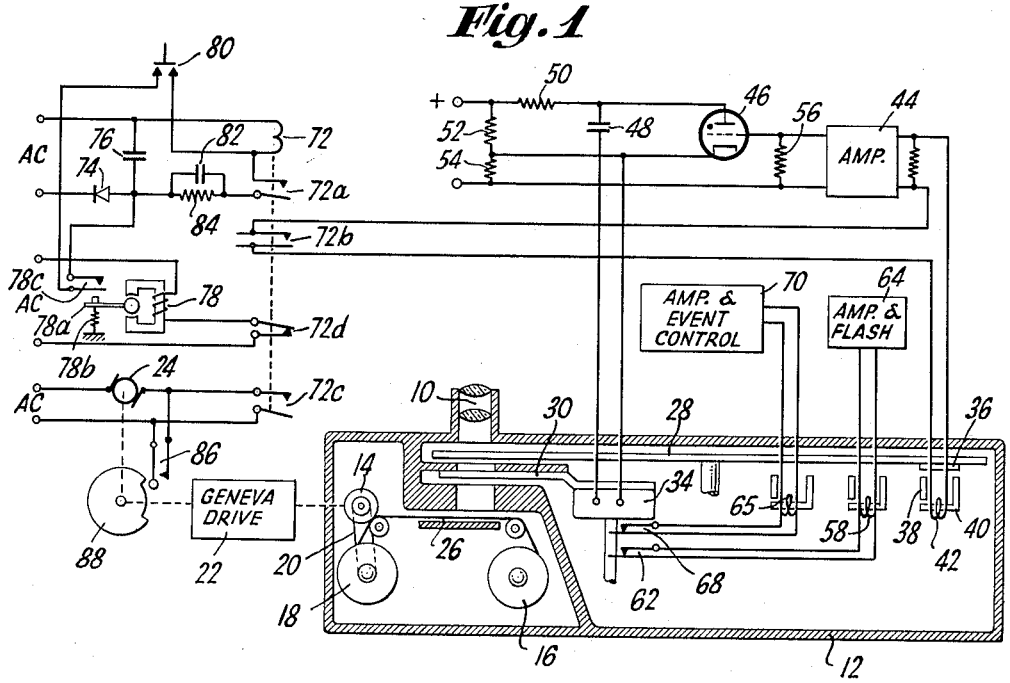
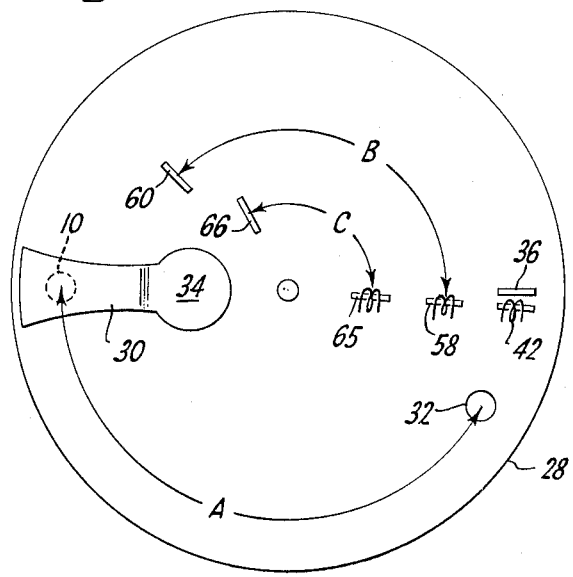
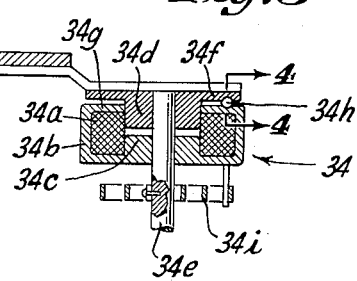
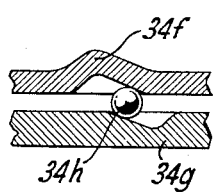
INVENTORS
PAUL S. MARTIN
SIDNEY X. SHORE
BY
Paul S. Martin
ATTORNEY

United States Patent Office 2,730,937
Patented Jan. 17, 1956

2,730,937

CAMERAS

Paul S. Martin, Flushing, and Sidney X. Shore, Roslyn Heights, N. Y.

Application July 9, 1954, Serial No. 442,278

11 Claims. (Cl. 95—11.5)

The present invention relates generally to cameras and in its various aspects it is particularly concerned with a novel electrically-operated shutter, and to photographic apparatus coordinated with and by such shutter.

It is an object of the invention to devise a novel camera capable of taking pictures of objects moving across the camera field at relatively high speed, such that serious blurring of the image should be expected with usual cameras. With the novel camera, this blurring is vastly reduced.

The object of reducing blurring of the image is ordinarily overcome by employing a focal-plane shutter with a very narrow slit, such that only a brief time is allowed for any elemental portion of the film to be exposed to light, even though the time of making the total exposure is great. The time occupied in the travel of the slit across the image plane is comparatively great, but the time of exposure of an elemental strip of film exposed through the slit in the focal-plane shutter is brief. It is well known that such a shutter cannot be used successfully with a type of electric flash source of illumination, colloquially called "strobe" in the photographic trade. Such source characteristically provides a flash duration of the order of $1/5000$ of a second or less, depending upon the design of the gaseous electric discharge tube and the voltage employed. With a single flash "strobe" for illumination, the focal-plane shutter would utilize the "strobe" light for only a small fraction of the image area. For successful "strobe" photography, a "between-the-lens" type of shutter is required. This is a term which is here applied to a shutter which moves across the back or the front of a lens as well as a shutter which technically moves between elements of a lens. With such shutters, the entire film area is exposed at one time. Commonly available shutter speeds are of the order of a $1/200$ or a $1/400$ of a second; and recently a shutter of $1/800$ of a second has been announced. Such shutters commonly have mechanical switch contacts which actuate the "strobe" when the shutter is almost fully open.

When the foregoing "strobe" and shutter are used to photograph an image moving across the field of the camera at high speed in ambient daylight, two images are produced: one is a sharp image, relatively free of blurring. This results from the "strobe" illumination and from the daylight illumination in effect during the brief "strobe" flash; and a second image is superimposed resulting from the sustained daylight illumination on the object as it moved during the entire exposure interval. It will be noted that the fastest "between-the-lens" shutter has an "open" time which is more than 10 times as long as the duration of the typical "strobe" flash mentioned above. In order to use "strobe" photography in strong daylight with such a lens to photograph moving objects it has appeared necessary to greatly reduce the lens aperture so as to minimize the amount of daylight that reaches the film during the shutter "open" time; and in order to obtain an image from the "strobe" illumination, the intensity of the "strobe" has been greatly increased.

This is objectionable to subjects being photographed, and it requires costly "strobe" equipment. The present invention provides a novel shutter particularly suited to use with a synchronized "strobe" light source permitting utilization of relatively low intensity "strobe" light sources, meeting a further object of the invention.

This is achieved through the use of greatly increased shutter speed, such that the amount of daylight that may reach the film during the shutter "open" time is greatly reduced, with consequent emphasis of the image resulting from "strobe" illumination. With short shutter "open" times, the amount of blur is reduced. It becomes feasible to increase the lens aperture so that even a relatively low-power "strobe" light source is efficiently used during the exposure. The reduction of shutter "open" time carries not only the obvious advantage of reducing the amount of daylight to reach the film during an exposure, but it also permits use of wider lens apertures with corresponding increased utilization of the "strobe" illumination. As a rough approximation it may be said that for the same density of smeared image resulting from daylight illumination, the required "strobe" power is reduced by four times when the shutter-speed is doubled. Additionally, the extent of the blur from the higher speed exposure is reduced in direct proportion to the reduction in exposure time. The ideal naturally is to reduce the exposure time to exactly the time of the "strobe" flash, provided that exact synchronization is also realized. The shutter in the following illustrative disclosure approaches and can be designed to attain this ideal in practice.

It is well known that the number of exposures that may be expected from a given shutter is drastically reduced as the operating speed is increased. This is because of the severe impacts inherent in starting mechanical shutter parts from rest to move at high speed and quickly to come to rest again. This limitation of high speed shutter operation is largely eliminated as a feature of the present invention.

In the illustrative disclosure which follows, a high speed continuously running wheel is used as a shutter element, the wheel having a hole which passes the lens barrel of the camera once during each revolution. The hole roughly corresponds to the size of the lens aperture. The time that is occupied by the traverse of this wheel aperture past the lens barrel can be made as small as may be desired simply by using a wheel of large radius and a high rotation speed. Plural geared oppositely rotating apertured wheels on a common axis are within the broad contemplation of the invention, although such gearing may cause objectionable wear that is avoided in a single-wheel shutter.

A blade or gate is employed in addition to the wheel so that the film is exposed only when both the gate is removed from the lens barrel and the hole in the wheel is passing the lens barrel.

Further features of the invention will be pointed out in connection with the illustrative disclosure which follows. In one aspect a long life shutter is attained through the use of a magnetic synchronizing pulse generator which initiates withdrawal of the mechanical gate as the aperture in the wheel approaches the lens barrel; and a further magnetic pulse generator identified with the wheel which synchronizes the operation of the "strobe" with the traverse of the wheel aperture past the lens barrel. The magentic pulse generators preclude mechanical coaction of the wheel with other mechanical parts commonly associated with "strobe" triggering, and with operation of such a gate which is found in association with comparable shutter wheels.

It is seen that an exposure is made under control of the wheel, which may be at any uncertain time interval removed from the lens barrel at the instant that a masterswitch is closed to initiate an exposure. This might represent a limitation in the use of the camera for photographing a stage in the high speed operation of a transitory event. Thus, if a hammer were to be impelled against a glass and the glass fragments are to be photographed in the process of scattering, it may be important to coordinate the actual exposure with the impact of the hammer against the glass. As a feature of the invention this may be accomplished by employing the wheel with a further control element to release the hammer at a time when the wheel aperture is approaching the lens barrel, at just the right time in advance for the desired exposure of a particular phase of the event.

The use of magnetic control devices associated with the shutter wheel promotes long life by eliminating frictional contacts that might otherwise be used. As a further feature of the invention in promoting long life of this high-speed shutter, a particular form of gate actuator and gate construction is used in a specific aspect of the invention. A solenoid is utilized having a very short stroke in the direction of reducing its air gap while at the same time a long mechanical stroke is realized through a mechanical motion-multiplying arrangement, and the shutter is carried as a unitary part of the armature that is operated by such solenoid. Such a structure involves a single shutter blade moving across an aperture plate, thereby eliminating wear points present in toggles, latches, detents, and like mechanisms found in usual shutters. Additionally, it is reset for the next exposure with nothing more than a spring. The gate is thus reduced to elemental simplicity as to the number of parts required.

The mechanical multiplication of motion referred to above is a conversion from the short axial thrust of the solenoid armature to produce a wide arcuate sweep, a rotary motion. The shutter blade carried by this armature is thus moved arcuately and axially. This axial motion is utilized, as will appear, for two purposes. First, by this axial stroke, the shutter blade or gate is carried out of face-to-face contact with an aperture plate which is pressed by the gate when at rest so as to close off all light. When operation has started, the axial stroke causes separation of the shutter and aperture plate, thereby reducing the friction, the wear, and the required operating power. Second, the axial travel of the gate actuating armature is utilized to operate a sequence switch which insures operation of the "strobe" magnetic control unit only after operation of the gate has commenced.

Various further featuers of the invention will be appreciated from the following detailed disclosure of a presently preferred illustrative embodiment of the invention, which is shown in the accompanying drawings forming part of this disclosure. In the drawings:

Fig. 1 is a combined diagrammatic representation of a camera, with parts shown in vertical cross-section and a wiring diagram of the camera coordinating circuit;

Fig. 2 is a view from below of certain elements shown in elevation Fig. 1;

Fig. 3 is a fragmentary view of a portion of the shutter of the camera in Fig. 1, partly in cross-section; and Fig. 4 is a greatly enlarged cross-section in the plane 4—4 of Fig. 3.

Referring now to Fig. 1, certain elemental portions of a camera are shown diagrammatically, portions of the casing and supporting structures being omitted for clarity. Lens 10 is supported at the front of the casing 12 which encloses a film-feeding roller 14 and supply and take-up reels 16 and 18, respectively. Take-up reel 18 is rotated by a belt 20 operated by feed-roller 14. This feed roller is driven intermittently by Geneva drive 22 and a motor 24. A strip of film 26 is suitably supported in an image plane at the proper distance away from lens 10. Between lens 10 and film 26 is a shutter wheel 28 and a shutter gate 30, one overlying the other. The wheel 28 is as close as reasonably practicable to lens 10. A continuously running motor (not shown) operates wheel 28 at high rotational speed. Wheel 28 has a hole 32 formed therein which advantageously is only large enough to transmit the light passing through lens 10 for the duration of a flash of the "strobe." As an example, hole 32 may be ⅜ of an inch in diameter at a radius of 3½ inches on a wheel which rotates 1800 R. P. M. With a ⅜ inch lens aperture, a calculated shutter speed of $\frac{1}{1600}$ second is attained.

Gate 30 normally is disposed in the path of light that might pass through hole 32 in wheel 28 and is prevented from reaching film 26 except during the exposure. Gate 30 is supported as a unit with the armature of an oscillatory solenoid 34, the details of which will be described in connection with Figs. 3 and 4.

In operation wheel 28 rotates continuously at high speed, carrying aperture 32 into line with lens 10 once each rotation in rapid repetition. When it is desired to make an exposure a burst of electrical energy is impressed upon solenoid 34 so as to withdraw gate 30 from the path of the light transmitted by the lens 10, and this gate is withdrawn for only one timed traverse of aperture 32 past the lens. It is observed that the shutter consists of a continuously running wheel and an intermittently operated gate, two moving parts in all; and that no part bears against continuously running wheel 28 in a way to introduce wear.

Gate 30 is made of thin and lightweight material such as blackened hard-rolled aluminum; but it nonetheless has a moment of inertia so that, compared to the exposure time, it takes a long time to withdraw gate 30 from the light path between the lens and the film. It is always to be fully withdrawn from that path when wheel 28 carries aperture 32 into exposure position. This gate and this wheel, as two parts of the shutter, are coordinated by the following electrical apparatus.

A small wafer 36 of soft iron is united to wheel 28 which is advantageously non-metallic although it may be of aluminum or other non-magnetic material. A bar magnet 38 is assembled to an L-shaped soft iron core 40, elements 36, 38 and 40 forming a rectangle with a short air-gap separating element 36 from elements 38 and 40 at one phase of operation of wheel 28. A coil 42 is wound around core 40 advantageously providing a high impedance resulting from a large number of turns of wire.

It will be understood that when wheel 28 carries soft iron wafer 36 quickly across magnetic elements 38 and 40, the reluctance of the magnetic circuit is abruptly reduced and then increased. This induces a full cycle of alternating-current voltage in coil 42. It may be noted that the same effect would be realized with element 36 in the form of a permanent magnet and elements 38 and 40 of soft iron; but in the arrangement shown a relatively heavy permanent magnet can be used and a high voltage pulse is obtained without requiring the wheel to carry a heavy mass. Using a tiny magnetic pulse generator and a relatively large, uncritical air gap, pulses of several volts are readily obtained.

Coil 42 is connected, through control contacts to be described, and through amplifier 44 to the grid of a thyratron 46. Between the plate and the cathode of this thyratron there are connected a condenser 48 and, in series therewith, solenoid 34. Condenser 48 is charged by a comparatively small current from a high voltage direct-current supply through current-limiting resistor 50. Resistors 52 and 54 form a voltage divider between the positive and the negative terminals of the direct-current supply, with the cathode of thyratron 46 connected to the positive terminal of resistor 54. A grid return resistor 56 is connected between the grid of thyratron 46 and the negative terminal of resistor 54 for normally applying hold-off bias on the thyratron grid.

After the control contacts of coil 42 are closed, a pulse is generated when element 36 next passes elements 38, 40, and this pulse when amplified in unit 44 overcomes the thyratron hold-off bias. With the thyratron thus rendered conductive, condenser 48 empties its charge into solenoid 34. This produces a quick oscillation of gate 30 away from the light path between lens 10 and film 26. It may take ⅓ of a revolution of the wheel 28 for the gate to reach its full-open position. This is taken into account by carrying conditioning element 36 close to elements 38, 40 at a time when hole 32 is (for example) ⅓ of a revolution away from the lens. Angle A in Fig. 2 illustrates this. A spring, to be described in connection with Fig. 3, restores gate 30 to its closed position, before aperture 32 reaches lens 10 in the subsequent rotation.

The value of resistor 50 is sufficiently high so that the thyratron does not remain conductive; but condenser 48 is recharged rather quickly through this resistor in readiness for the next operation. The charging current is a matter of a few milliamperes, whereas the solenoid actuating current is a brief pulse of an ampere or more, in an example.

It is desirable as previously described for the flash of the "strobe" to occur only when gate 30 is withdrawn to make an exposure, and at the instant that aperture 32 is in line with lens 10. For this purpose a control magnet and solenoid assembly 58 is disposed close to wheel 28; and that wheel is provided with a piece of soft iron 60. This magnetic pulse-generator is the same in all respects as that represented by elements 36, 38, 40, and 42 previously described.

A pair of mechanical switch contacts 62 are arranged in control relation to pulse generator 58. These contacts, as shown, operate to short-circuit the output of generator 58 when gate 30 is closed. When gate 30 opens, solenoid 34 operates its armature axially so as to open contacts 62 and condition the generator to deliver a pulse when the iron wafer 60 next reaches the pulse generator 58. Contacts 62 might readily be series-connected to generator 58, in which case they would be normally open and would be closed by operation of solenoid 34. Further, contacts 62 can be operated by a relay in series or parallel with solenoid 34, but the arrangement shown is preferred as being more efficient.

When a pulse is generated in unit 58, at a time when contacts 62 are open, "strobe" unit 64 is actuated to emit a light burst. Typically this is of the order of ⅟₅₀₀₀ second, but may be much shorter or somewhat longer according to the design of the unit selected. The relative positions of hole 32, wafer 60, lens 10, and generator 58 are such as to result in a flash occurring just as hole 32 passes the lens and at a time when gate 30 is withdrawn. This timing may be readily checked by directing the flash from the film region (with the film removed) and operating the camera in the dark. If the flash occurs at the proper instant, reflections from the lens will be seen with the observer looking toward the lens from a position alongside the "strobe."

A further pulse generator 65 is provided, adjacent wheel 28, together with a soft iron piece 66 on the wheel and control contacts 68 arranged to be actuated by solenoid 34. These are in all respects like the arrangement and operation of parts 58, 60 and 62. These operate to control an external brief event to be photographed at a particular phase of the event. To adjust the timing thereof, unit 62 is advantageously circumferentially adjustable, to actuate external control unit 70 at any period in advance of the actual exposure between the start of operation of solenoid 34 and the actual exposure that follows. Unit 70 may, for example, consist essentially of an amplifier, a latch and a solenoid to release the latch. This may release a spring-impelled hammer if it is desired to photograph the effect of the hammer within milliseconds after such release, using a wheel and gate of the values in the example given. Other uses of the event controller will be self-evident.

The construction of solenoid 34 may now be described. This includes a coil 34a within a soft iron shell 34b that is reentrant to form a pole 34c. An armature 34d of soft iron has a guide shaft 34e that slides in a bearing in pole 34c. Flange 34f as an extension of armature 34d overlies upper portion 34g of shell 34b, and at regular intervals about flange 34f there is a series of balls 34h (only one shown) which are confined between slant tracks (Fig. 4) formed in elements 34f and 34g.

When a potential is applied to coil 34a, pole 34c attracts armature 34d with considerable force. In an example, a few microfarads charged to a few hundred volts in the circuits shown affords ample impulse energy to operate the gate 30 secured to armature 34d through a 25 degree angle in about 10 milliseconds—this despite a stiff spiral return spring 34i secured to shaft 34e and to casing 34b. This spring quickly restores the unit to starting condition as soon as the peak energy of the condenser discharge has dissipated.

When armature 34d swings gate 30 away from hole 12a in plate 12b of casing 12, the armature also draws gate 30 out of face-to-face contact with plate 12b. This eliminates further frictional resistance to the opening and closing swinging of the gate, and makes for reliable, efficient, rapid operation of the gate. In the return stroke of the armature as enforced by the spring and the ball-and-track arrangement, gate 30 is returned to plate 12b to provide a firm face-to-face contact and a reliable light seal.

The axial motion of shaft 34e is additionally utilized, as described, to operate contacts 62 and 68.

To operate the camera in reliable, orderly fashion, the following novel control system is provided.

A main control relay 72 is provided, having normally open contacts 72a, 72b, and 72c, and normally closed contacts 72d. A rectifier 74 and condenser 76, energized from alternating current mains, provide direct current to operate relay 72. A timer 78 is included, in an example including a low-power self-starting synchronous motor with suitable gear reduction to an arm 78a, a reset spring 78b, and contacts 78c. Timer 78 normally closes contacts 78c and is normally energized constantly so as to be arrested at its extreme operated position at which spring 78b is tensioned. Contacts 78c complete the circuit to relay 72 from the direct current supply 74, 76 via main control switch 80 when closed. This may be either a quick impulse or a prolonged closing, for the relay circuit will respond alike to both by virtue of a special holding circuit that is included. A condenser 82 is provided in a series circuit with stick-circuit contacts 72a. This parallels the series circuit consisting of contacts 78c and 80. When relay 72 is momentarily energized after switch 80 is operated, contacts 72a close, and the current passed by condenser 82 as it charges keeps relay 72 momentarily energized, about ¼ second in an example. After this holding interval, condenser 82 does not pass enough current, due to its decreased charging rate, to hold relay 72 which thereupon drops out. When contacts 72a open, condenser 82 discharges through its shunt resistor 84 in readiness for the ensuing cycle of operations. Resistor 84 is made high enough so as not to carry enough current to energize relay 72.

When relay 72 first operates, and during the interval that condenser 82 holds the relay in operated position, contacts 72d open and timer 78 is started in a new timing cycle. Contacts 78c are open for the desired timing interval, and during that interval main contacts 80 are of no effect. The purposes of this disabling delay will presently be clear.

Motor 24 that advances the film has been briefly mentioned above. This motor is energized initially via contacts 72c. These contacts remain closed for the hold time afforded by condenser 82. Thereafter contacts 86 close, motor 24 being effective to rotate contact-operating cam 88. At the end of one feed step, cam 88 releases contacts 86 and the feed motor stops.

Contacts 72b close when relay 72 is energized, to complete the circuit from coil 42 to the energizing circuit for solenoid 34. This is no guarantee that an exposure will follow, for control wafer 36 may be nearly one rotation period away from coil 42. However, the short-time stick circuit 82, 72a insures that the exposure will follow. The hold time of the stick circuit is longer than one period of rotation of wheel 28.

The purposes of the timing circuit 72d, 78, 78c will now be apparent. First, it prevents a new exposure from being made until after full-measure advance of the film has been completed. Then, it insures full recharge of condenser 48 for uniform actuation of solenoid 34 and gate 30. (Timing contacts 72b open relatively quickly, so that pulses from coil 42 do not repeatedly fire thyratron 46 and thus prevent recharge of condenser 48.) Finally, it allows the flash apparatus the necessary minimum time interval to recharge for a renewed full-intensity flash operation.

Switch 80 may be operated manually or by any automatic device, the entire camera and "strobe" assembly being automatic as described. Relay 72 holds contacts 72b closed long enough to insure operation of pulse generator 36, 38, 40, 42; and thereafter the shutter parts control their own coordination as well as the coordination of the "strobe" and of the external vent control. After a pulse comes from coil 42, the gate instantly starts to open; no delay is involved such as is incident to the operation of clutches, relays and so on.

The synchronization achieved specifically by magnetic pulse generators is distinctive. This might be accomplished by having contacts carried by wheel 28 past fixed contacts. Such an arrangement would introduce wear, which is objectionable where the camera is to be constantly in operation over long periods of time. Photocells and a light source might be considered; but this would introduce complications, when it is realized that wheel 28 as the control element is enclosed in the casing 12 that should be light-tight except for the lens.

Further, devices 42, 58, 65 might be coils or plates in respective oscillators, which can be arranged to be disturbed by devices 36, 69 and 66 of the wheel, the oscillator disturbance being utilized to effect the control functions described. Such arrangement is readily conceivable, but its relative complexity is apparent. The magnetic system described has numerous advantages as noted that make it especially advantageous.

What is claimed is:

1. A camera including a lens, a continuously driven wheel having an aperture cyclically alignable with the lens, a movable blade normally closing off the light path provided by the lens and the apertured wheel, an electromagnet having an armature joined to said blade, and a condenser-discharge circuit controlled by said wheel for energizing said electromagnet in advance of the arrival of the wheel aperture at the lens.

2. A camera having a lens, a continuously driven nonmagnetic wheel having an aperture cyclically alignable with the lens, a movable light gate normally blocking the path provided by the lens and the apertured wheel, an electrical actuator for said gate, a magnetic element on said wheel, a magnetic core and coil disposed adjacent the path of said element, the magnetic circuit of said element and said core including a source of magnetomotive force, said core having a control connection to said electrical actuator and the relationship of said element, said core, said aperture and said lens being phased to start the withdrawal of the gate as the wheel aperture approaches said lens.

3. A camera in accordance with claim 2 including in combination an external control, a switch in control relation to said coil, and a holding circuit established by said external control and effective to maintain said switch operative from the time of operation of the external control at least until said element reaches said core.

4. In combination, the camera as defined in claim 2 and a source of electric flash illumination, a control pulse generator including a control element on said wheel, and means coordinated with said gate for rendering said pulse generator operative to actuate said flash source.

5. The camera in accordance with claim 2, including a switch coordinated with said gate, a pulse generator including a portion carried by said wheel and controlled by said switch, and an external device controller actuated by said pulse generator as controlled by said wheel.

6. Apparatus in accordance with claim 5 wherein said electrical gate actuator includes a rotary and axially movable armature and wherein said coordinated switch is physically disposed in the axial path of said armature.

7. In combination, a lens, a camera including a continuously driven wheel having an aperture cyclically moved into alignment with said lens, a gate normally blocking the light path through said lens and said aperture when aligned with the lens, electrical means for operating said gate including a pulse generator having a timing portion carried by the wheel, a source of strobe illumination, a second pulse generator in control relation to said "strobe" source and including a timing portion on said wheel, and means coordinated with said gate in control relation to said second pulse generator to actuate same only upon operation of the gate.

8. The combination as set forth in claim 7, including a main control device, a timer in control relation to said device so as to be initiated in operation thereby and in disabling relation thereover, whereby camera operation is suppressed after each operation until a suitable interval has passed appropriate to the required recharging time of said "strobe" illumination source.

9. A camera shutter including a fixed aperture plate, a blade normally closing off the aperture in said aperture plate, an armature joined to said blade, a solenoid effective to impart mechanical energy to said armature so as to remove said blade from said aperture, a pulse energy source in a circuit controlling said solenoid, a restoring spring for said armature effective to return said blade to its normal position closing off said aperture after dissipation of an energy pulse applied to said solenoid and thereby applied to said armature and said blade, a continuously driven wheel having an aperture aligned during each rotation with said aperture in said aperture plate, and electrical coupling between said wheel and said pulse energy circuit effective to start withdrawal of said blade from said aperture as the wheel aperture approaches said aperture in said aperture plate.

10. A camera shutter for operation by an electrical pulse power supply, including a fixed aperture plate, a movable blade having a portion in face-to-face contact with said aperture plate and closing off the aperture therein, an armature joined to and supporting said movable blade, said armature having an arcuately oscillatory and axially reciprocable bearing, a solenoid having leads for the pulse power supply for operating said armature axially, a mechanical energy converter effective to impart arcuate motion to said armature upon axial operation thereof, said armature being oriented relative to said aperture plate to shift said blade normal to its surface to relieve the frictional contact of said blade portion against said plate and to sweep said portion arcuately across the face of said aperture plate to remove said portion from the aperture in the aperture plate, and a restoring spring for said blade and said armature.

11. A camera shutter for operation by an electrical pulse power supply, including a fixed aperture plate, a movable blade having a portion in face-to-face contact with said aperture plate and closing off the aperture therein, an armature joined to and supporting said movable blade, said armature having an arcuately oscillatory and axially reciprocable bearing, a solenoid having leads for the pulse power supply for operating said armature axially, a mechanical energy converter effective to impart arcuate motion to said armature upon axial operation thereof, said armature being oriented relative to said aperture plate to shift said blade normal to its surface to relieve the frictional contact of said blade portion against said plate and to sweep said portion arcuately across the face of said aperture plate to remove said portion from the aperture in the aperture plate, and a restoring spring for said blade and said armature, said armature being disposed with its axis substantially perpendicular to the face of said aperture plate engaged by said blade portion and said armature being biased toward said plate by said spring and said mechanical energy converter.

References Cited in the file of this patent

UNITED STATES PATENTS

| Number | Name | Date |
|---|---|---|
| Re. 21,149 | Tonnies | July 11, 1939 |
| 660,006 | Doyen | Oct. 16, 1900 |
| 1,444,365 | Bowes | Feb. 23, 1923 |
| 1,933,267 | Keith et al. | Oct. 31, 1933 |
| 2,032,380 | Stevens | Mar. 3, 1936 |
| 2,055,089 | Roters | Sept. 22, 1936 |
| 2,105,475 | Draeger | Jan. 18, 1938 |
| 2,247,809 | Hartman et al. | July 1, 1941 |
| 2,345,365 | Steiner | Mar. 28, 1944 |
| 2,347,700 | Aronoff | May 2, 1944 |
| 2,383,381 | Hammond | Aug. 21, 1945 |
| 2,430,940 | Leland | Nov. 18, 1947 |
| 2,496,880 | Leland | Feb. 7, 1950 |
| 2,605,673 | Manderfeld | Aug. 5, 1952 |
| 2,616,050 | Marshall | Oct. 28, 1952 |

FOREIGN PATENTS

| Number | Country | Date |
|---|---|---|
| 524,231 | France | May 10, 1921 |
| 552,545 | France | Jan. 24, 1923 |
| 241,009 | Switzerland | Jan. 1, 1946 |